United States Patent [19]

Bosso et al.

[11] 4,170,579

[45] * Oct. 9, 1979

[54] COATING COMPOSITIONS COMPRISING AQUEOUS DISPERSIONS OF QUATERNARY AMMONIUM BASE GROUP-CONTAINING POLYMERS AND A CURING AGENT

[75] Inventors: Joseph F. Bosso, Lower Burrell; Marco Wismer, Gibsonia, both of Pa.

[73] Assignee: PPG Industries, Inc., Pittsburgh, Pa.

[*] Notice: The portion of the term of this patent subsequent to Jan. 31, 1995, has been disclaimed.

[21] Appl. No.: 873,586

[22] Filed: Jan. 30, 1978

Related U.S. Application Data

[63] Continuation-in-part of Ser. No. 744,534, Nov. 24, 1976, Pat. No. 4,071,428.

[51] Int. Cl.$^2$ .............................. C08J 3/06; C08J 3/08; C08L 63/00; C08L 63/10
[52] U.S. Cl. .................... 260/29.2 TN; 260/29.2 EP; 260/29.3; 260/29.4 R; 260/29.4 UA; 204/181 C; 428/418
[58] Field of Search ................ 260/29.2 TN, 29.2 EP, 260/29.3, 29.4 R, 29.4 UA; 526/55; 204/181 C; 428/418

[56] References Cited

U.S. PATENT DOCUMENTS

| | | | |
|---|---|---|---|
| 2,676,166 | 4/1954 | Webers | 260/2 EP |
| 2,838,397 | 6/1958 | Gruntfest et al. | |
| 3,023,162 | 2/1962 | Fordyce et al. | |
| 3,479,310 | 11/1969 | Dieterich et al. | 260/29.2 TN |
| 3,799,854 | 3/1974 | Jerabek | 260/29.2 EP |
| 3,839,252 | 10/1974 | Bosso et al. | |
| 3,928,157 | 12/1975 | Suematsu et al. | |
| 3,984,382 | 10/1976 | Parekh et al. | |
| 4,009,133 | 2/1977 | Jones | 260/29.2 TN |
| 4,066,523 | 1/1978 | McGinniss | 260/29.2 TN |
| 4,071,428 | 1/1978 | Bosso et al. | 204/181 C |
| 4,076,676 | 2/1978 | Sommerfeld | 260/29.2 EP |

*Primary Examiner*—Allan Lieberman
*Attorney, Agent, or Firm*—William J. Uhl

[57] ABSTRACT

Articles coated with a resinous composition which is deposited from an aqueous dispersion comprising a quaternary ammonium base-containing polymer are disclosed. Also disclosed are thermosetting water-dispersible resinous compositions comprising the quaternary ammonium base group-containing polymers in combination with curing agents. Aqueous dispersions of the polymers are useful in coating applications such as cationic electrodeposition. The aqueous dispersions are also useful in conventional coating applications such as flow, dip, spray and roll coating.

8 Claims, No Drawings

COATING COMPOSITIONS COMPRISING AQUEOUS DISPERSIONS OF QUATERNARY AMMONIUM BASE GROUP-CONTAINING POLYMERS AND A CURING AGENT

CROSS-REFERENCE TO RELATED APPLICATIONS

This application is a continuation-in-part of copending application Ser. No. 744,534, filed Nov. 24, 1976, now U.S. Pat. No. 4,071,428, patented Jan. 31, 1978.

BACKGROUND OF THE INVENTION

Field of the Invention

The present invention relates to coated articles and more particularly relates to articles coated with a resinous composition which is deposited from an aqueous dispersion comprising a quaternary ammonium base-containing polymer. The invention also relates to thermosetting, water-dispersible resinous compositions comprising the quaternary ammonium base-containing polymer in combination with a curing agent.

Brief Description of the Prior Art

Electrodeposition as a coating application involves the deposition of a film-forming material under the influence of an applied electrical potential and has become of increasing commercial importance. Various resinous or polymeric film-forming materials have been developed for use in electrodeposition. Most of these resinous materials contain acid groups which are neutralized with a base such as an amine or an alkali metal hydroxide. These resin vehicles electrodeposit on the anode and because of their acidic nature tend to be sensitive to corrosive attack of alkali and salt. Further, during anionic electrodeposition, oxygen and metal ions evolved at the anode many discolor the depositing resin.

To overcome these problems, there has been a movement in the electrocoating industry to use cationically charged resins which deposit on the cathode during electrodeposition. Deposition on the cathode has the advantage over deposition on the anode in that only hydrogen is evolved at the cathode. Hydrogen evolution has no detrimental effect on the depositing resin, and in addition, cationically deposited resins frequently provide better corrosion resistance than anionically deposited resins.

An example of suitable cationic resins is found in U.S. Pat. No. 3,839,252 to Bosso et al which discloses cationically charged resins for electrodeposition on the cathode which comprise the reaction product of a polyepoxide such as a polyglycidyl ether of a polyphenol with a tertiary amine acid salt such as the acetic acid salt of dimethylethanolamine.

SUMMARY OF THE INVENTION

The present invention relates to coated articles, particularly coated metal articles, comprising a solid substrate having thereon a resinous coating composition. The resinous coating composition is deposited on the substrate from an aqueous dispersion of the resin in which the resin comprises a quaternary ammonium base-containing polymer formed from reacting:

(1) a polymeric tertiary amine which is the reaction product of a polyepoxide and a secondary amine with
(2) a 1,2-epoxy-containing material having the structural formula:

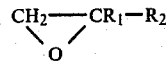

wherein $R_1$ is hydrogen and methyl and $R_2$ is hydrogen, alky, aryl in which the alkyl including cycloalkyl and aryl moieties preferably contains from 1 to 18 carbon atoms, substituted alkyl and aryl such as $CH_2OR_2$,

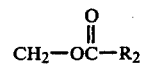

where $R_2$ is alkyl, including cycloalkyl, aryl, preferably in which the alkyl and aryl moieties contain from 1 to 18 carbon atoms;

the reaction of (1) and (2) being conducted in the presence of a sufficient amount of acid and/or water for the formation of quaternary ammonium base groups.

The present invention also relates to thermosetting water-dispersible resinous compositions comprising the quaternary ammonium base-containing polymers as described above which contain active hydrogens such as hydroxyl, thiol, primary and secondary amino groups in combination with a curing agent.

The curing agent is one which is stable at ordinary room temperature, that is, 20° to 25° C., in the presence of the quaternary ammonium base-containing polymer but reactive with the active hydrogens of the quaternary ammonium base-containing polymer at elevated temperatures, for example, 90°–200° C., to form a cross-linked product.

Pertinent Prior Art

Quaternary ammonium base group-containing polymers which are formed from reacting a polymeric tertiary amine with 1,2-epoxy-containing compounds such as propylene and ethylene oxide are shown in U.S. Pat. Nos. 2,838,397 to Gruntfest et al and 3,023,162 to Fordyce et al. However, neither of these references are directed to coated articles nor to thermosetting resinous coating compositions. The '397 patent is directed to a process of producing mineral-filled papers and the '162 patent is directed to the use of quaternary ammonium base group-containing polymers as flocculating agents to increase the filtration rate of aqueous suspensions of finely divided water-insoluble materials.

U.S. Pat. No. 3,928,157 to Suematsu et al discloses quaternary ammonium salt group-containing resins for use in cationic electrodeposition of chromium plated surfaces. Although the quaternary ammonium salt group-containing resins are being prepared from polyamino resins, there is no disclosure in the patent of reacting polymeric tertiary amine resins with a 1,2-epoxy material.

U.S. Pat. No. 3,984,382 to Parekh et al relates to cationic vinyl copolymers prepared by the copolymerization of styrene, maleic anhydride and an alkyl acrylate. The polymer is reacted with amino alcohols and/or certain difunctional amines containing tertiary nitrogen atoms followed by reaction with monoepoxides. The product is solubilized by the addition of acid and the solubilized product is disclosed as being useful in cationic electrodeposition. The compositions of the present claims differ from those of U.S. Pat. No. 3,984,382 in that they require the formation of the quaternary ammonium hydroxide groups through reaction of the epoxy moieties in the 1,2-epoxy-containing material with the tertiary amine-containing moieties in the polymeric tertiary amine. In U.S. Pat. No. 3,984,382, the epoxy reacts with the carboxylic acid functionalities in the polymer backbone. These carboxylic acid functionalities are derived by pre-reacting the anhydride moieties derived from maleic anhydride with the amino alcohols or the difunctional amines. The epoxy then reacts with the carboxylic acid functionalities to form the epoxy ester.

DETAILED DESCRIPTION

The polymeric tertiary amine used in the invention is a polymer containing tertiary amine functionality. The polymeric tertiary amines can be prepared from polymerizable tertiary amines such as by vinyl addition polymerization of unsaturated monomers at least one of which contains amino functionality.

Typical amine compounds used for vinyl copolymerization are as follows: amine-containing esters of monofunctional unsaturated acids of the general formula:

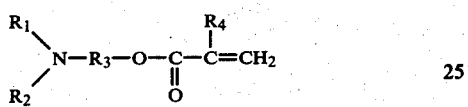

wherein $R_1$ and $R_2$ are the same or different and are alkyl, alicyclic or aryl groups which preferably contain from 1 to 8 carbon atoms, most preferably $R_1$ and $R_2$ are alkyl and contain from 1 to 4 carbon atoms; $R_3$ is $-(CH_2)_n-$ with n having a value of from 1 to 6; and $R_4$ is an alkyl group which preferably contains from 1 to 8 carbon atoms or is hydrogen. Examples of such materials include acrylic or methacrylic esters of diethylamino-ethanol and dimethylaminoethanol. Examples of other amine-containing esters are amine-containing diesters of difunctional unsaturated acids such as maleic acid, fumaric acid or itaconic acid esterified with alcohols of the general formula:

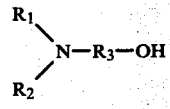

wherein $R_1$, $R_2$ and $R_3$ have the meanings as described above.

Examples of other amine compounds used for vinyl polymerization are vinyl-containing heterocyclic compounds such as N-vinylpiperidine or N-vinyl-3-pyrrolidone.

Copolymers of the above amine-containing compounds are those derived by addition polymerization of the above-mentioned amine-containing compounds as one monomer and at least one other monomer containing the group $>C=C<$ capable of vinyl addition polymerization. Examples of the above monomers include esters of acrylic acid or methacrylic acid with monobasic alcohols containing from about 1 to 8 carbon atoms such as methanol, ethanol and 2-ethylhexanol. Specific examples include methyl acrylate, methyl methacrylate, ethyl acrylate, ethyl methacrylate, butyl acrylate, butyl methacrylate, 2-ethylhexyl acrylate, 2-ethylhexyl methacrylate, octadecyl acrylate and octadecyl methacrylate.

Examples of other monomers include vinyl esters of saturated monobasic acids, for example, vinyl acetate, vinyl propionate, vinyl butyrate, vinyl laurate and vinyl stearate.

Also, vinyl aromatic compounds such as styrene, vinyltoluene and alpha-methylstyrene can be employed as the copolymerizable monomer. Exmples of other monomers include acrylonitril, methacrylonitrile, ethacrylonitrile, acrylamide, methacrylamide and ethacrylamide. Obviously, mixtures of copolymerizable monomers can be used.

For thermosetting compositions, the tertiary nitrogen-containing polymers contain unreacted active hydrogens such as hydroxyl, thiol, primary and secondary amino and amido so that they may participate in a subsequent crosslinking reaction with a curing agent such as a capped polyisocyanate, an amine-aldehyde condensate, and a phenol-aldehyde condensate. In these instances, it is desirable to introduce active hydrogens into the polymer by using active hydrogen-containing compounds as the copolymerizable monomer. Examples of suitable compounds would be unsaturated amides such as acrylamide, methacrylamide or their n-alkyl derivatives; unsaturated alcohols such as monoesters of diols with unsaturated acids, for example, hydroxypropyl or hydroxyethyl acrylate or methacrylate and unsaturated secondary amines such as tert-butylaminoethyl methacrylate.

Self-curing compositions can be prepared by using as a portion of the vinyl monomers, hydroxyl-containing vinyl monomers and alkoxymethyl-containing ethylenically unsaturated amines such as N-alkoxymethyla-crylamides, N-alkoxymethylmethacrylamides, alkoxymethyldiacetoneacrylamides, and N-methyl-N-alkoxymethylacrylamide. Examples are N-butoxy-methacrylamide and N-butoxy-acrylamide. In these compositions, the curing agent (the N-alkoxymethyl groups) is integral with the polymer containing the quaternary ammonium base groups (and also —OH groups). Curing occurs through a transetherification reaction at elevated temperature with the hydroxyl groups in the polymer resulting in elimination of an alcohol (from the N-alkoxy group).

Methods of preparing the addition type polymers mentioned above are well known in the art. Any known polymerization initiator of a free radical type compatible with amine-containing compounds and optionally a chain transfer agent can be used. Specific examples of suitable catalyst would be azobis(isobutyronitrile) and diazothioether. Examples of suitable chain transfer agents would be, for example, butyl mercapto-propionate and mercaptoethanol.

Other polymeric tertiary amines which are suitable in the practice of the invention are the reaction product of polyepoxides, such as a polyglycidyl ether of a polyphenol, with seconary amines. The polyepoxide utilized to form the tertiary amine-containing adduct is a polymeric material containing two or more epoxy groups per molecule. The polyepoxides are or relatively high molecular weight, having molecular weights of at least 350 usually within the range of about 350 to 2000. The polyepoxides can be any of the essentially well known types of polyglycidyl ethers of polyphenols, for example, bisphenols such as Bisphenol A, which are produced by etherification of the polyphenol with epihalohydrin in the presence of alkali.

The reaction of the secondary amine with the polyepoxide takes place upon admixing the amine and the polyepoxide. Reaction occurs by the secondary amine groups opening the epoxide ring forming a tertiary amine and a secondary hydroxyl group. The amine used is an organic secondary amine, usually a mono-secondary amine. Examples of such amines include di- lower alkyl amines and hydroxy-containing di- lower alkyl amines in which the alkyl group contains from 1 to 4 carbon atoms such as dimethylamine, diethylamine, dipropylamine, N-methylethanolamine, diethanolamine and the like. A solvent such as a water-miscible ester, ether or ketone may be employed in conducting the reaction. Reaction may be exothermic and cooling may be desired. However, heating to a moderate temperature, that is, within the range of 50° to 150° C., may be used to hasten the reaction. The amount of amine reacted with the polyepoxide is that which will be sufficient such that when the amine-epoxy adduct is subsequently quaternized, it will be dispersible in aqueus medium and of sufficient cationic character to be electrodepositable on the cathode. For a more detailed description on adducts formed by reacting a polyepoxide with a secondary amine, see U.S. Pat. No. 3,984,299 to Jerabek.

An example of another tertiary amine-containing polymer is a poly(amine-amide) polymer containing tertiary amine groups. Such polymers are prepared by condensation of dicarboxylic acids and polyamines. The dicarboxylic acids are those represented by the structured formula:

HOOC—R—COOH where R is a saturated or unsaturated aliphatic hydrocarbon group or aromatic hydrocarbon group having from 1 to 34 carbon atoms. Examples include phthalic acid, malonic acid, maleic acid, fumaric acid, succinic acid, azelaic acid, adipic acid, sebacis acid, dimerized fatty acids such as dimerized linolenic acid. The polyamines are polyalkylene polyamines having primary amino groups at both ends of the amine chain, represented by the general formula:

$H_2N-R_1-NH_2$ wherein $R_1$ is an aliphatic hydrocarbon group having 2 to 6 carbon atoms. Examples of such polyamines are ethylenediamine, propylenediamine, butylenediamine, hexamethylenediamine, tetraethylenepentamine, pentaethylenehexamine, hexamethyleneheptamine, hexaethyleneoctamine, diethylenetriamine, triethylenetetramine, bis(3-aminopropyl)-amine, 1,3-bis(3'-aminopropylamino)propane.

Although specific tertiary amine-containing polymers have been described above, it should be clear that other polymers could be used, for example, the Michael addition product of a polymer containing unsaturation with a secondary amine.

The 1,2-epoxy-containing materials which are used for quaternizing the tertiary amine-containing polymers are selected from those having the follpwing structural formula:

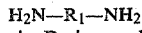

where $R_1$ is hydrogen and methyl and $R_2$ is hydrogen, alkyl including cycloalkyl, aryl preferably containing from 1 to 18 carbon atoms, substituted alkyl and aryl moieties such as $CH_2OR_2$,

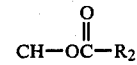

where $R_2$ is alkyl including cyclalkyl, aryl and substituted alkyl including cycloalkyl and aryl in which the alkyl and aryl moieties contain from 1 to 18 carbon atoms. $R_1$ and $R_2$ can be unsubstituted or substituted with substituents such as OH or alkoxy as long as the substituents do not interfere with the reaction of the epoxy with the amine-containing polymer, and the substituents are of such a nature or employed under conditions that they will not gel the reaction mixture. A preferred substituted group is one in which $R_1$ is an alkyl group substituted with an N-heterocyclic material, i.e.,

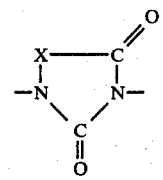

wherein X is a bivalent organic radical necessary to complete a 5 or 6-membered unsubstituted or substituted heterocyclic ring. Preferably, X is

Examples of suitable 1,2-epoxy-containing materials are the monoepoxides such as alkylene oxides containinin from 2 to 8 carbon atoms including ethylene oxide, propylene oxide, 1,2-butylene oxide, 1,2-pentene oxide, styrene oxide and glycidol. Examples of other suitable materials are glycidyl esters of monobasic acids such as glycidyl acrylate, glycidyl methacrylate, glycidyl acetate, glycidyl butyrate, glycidyl palmitate, glycidyl laurate and glycidyl esters sold under the trademark CARDURA ® E. Other suitable materials are glycidyl ethers of alcohols and phenols such as butyl glycidyl ether, octyl glycidyl ether, phenyl glycidyl ether and para-(tertiary-butyl)phenyl glycidyl ether.

The polymeric tertiary amine and the 1,2-epoxy-containing material are reacted in the presence of a sufficient amount of acid and/or water for the formation of quaternary ammonium base groups. It should be understood that by the expression "reacted in the presence of a sufficient amount of acid and/or water" is meant the reaction between the polymeric tertiary amine and the 1,2-epoxy-containing material can be conducted neat or in the presence of organic solvent, in the absence of acid and/or water, and sufficient acid and/or water subsequently added after a period of reaction for the formation of quaternary ammonium base groups. However, conducting the reaction with acid or water present from the beginning is preferred because it results in the formation of quaternary ammonium base groups without significant molecular weight advancement of the material. Conducting the reaction in the absence of acid or water results in a molecular weight advancement of the epoxy. It is believed that the epoxyamine adduct prepared in the absence of acid of water is a very active catalyst for epoxy-epoxy reactions resulting in a molecular weight build up through the unreacted epoxy groups. Acid or water can be added to the reaction mixture after reaction has proceeded for a period of time resulting in the formation of quaternary ammonium base groups.

Even when conducting the polymeric tertiary amine-1,2-epoxy-containing material reaction in the presence of water, there can be a molecular weight build up of the epoxy if the reaction is not conducted fast enough. The quaternary ammonium hydroxide groups are also active catalysts for epoxy-epoxy reactions. Therefore, it is desired to carry out the reaction between the polymeric tertiary amine and the 1,2-epoxy material at a fast rate. Preferably, a stoichiometric excess of amine to epoxy, that is, a molar excess, will be present during the reaction. Thus, the 1,2-epoxy-containing material can be added slowly to a mixture of amine and water in order to maintain an excess of amine.

Conducting the reaction in the presence of acid is preferred in certain instances when the quaternary ammonium base group-containing polymer is to be used in electrodeposition. Aqueous dispersions of the resultant quaternary ammonium salt group-containing polymers electrodeposit as self-insulating films with greater rupture voltages and throwpower than comparable quaternary ammonium hydroxide-containing polymers.

In conducting the reaction in the presence of acid, the polymeric tertiary amine can first be neutrailized with acid to form the tertiary amine salt followed by reaction with epoxy. Alternately, the epoxide, tertiary amine-containing polymer and acid can be reacted simultaneously, or the amine and epoxide can be first reacted followed by acidification of the reaction product. Suitable acids are water-soluble organic acids such as carbonic acid, formic acid, acetic acid and the like. Acids like phosphoric acid can also be used.

Although quaternary ammonium salt group-containing resins are preferred for certain reasons as mentioned above, quaternary ammonium hydroxide group-containing resins are preferred for other reasons. The quaternary ammonium salt group-containing resins are neutralized with acid. When the resin electrodeposits, acid is generated at the anode and in the case of a non-volatile or non-decomposible acid such as acetic acid, will continuously build up in the electrodeposition bath where the acid can corrode the equipment and raise the conductivity of the bath making it difficult to electrodeposit smooth uniform coatings.

Also employing quaternary ammonium salt group-containing resins for other conventional coating applications such as flow, dip, spray and roll coating is not completely satisfactory. The resultant coating will contain the acid salt which upon baking will decompose volatilizing acid which can cause extensive corrosion problems in the baking oven.

The quaternary ammonium hydroxide-containing polymers overcome these problems because only water will be generated during electrodeposition and during baking of coatings applied by the other conventional coating applications.

The amount of water and/or acid which is used in the practice of the invention should be sufficient to result in the formation of quaternary ammonium base groups. Preferably based on amine groups, a stoichiometric equivalent or excess of acid and/or water, that is, at least one mole of acid and/or water per mole of amine, is used.

Even when conducting the reaction in the presence of acid, it is desirable to have water present so as to control the exothermic amine-epoxy reaction. Typically, about 1.0 to about 16 moles of water per equivalent of amine nitrogen is used.

With regard to the amount of tertiary amine-containing polymer and 1,2-epoxy-containing material which are reacted with one another, the relative amounts can be varied and depend on the extent of quaternization desired, and this in turn will depend on the molecular weight and structure of the tertiary amine-containing polymer. The extent of quaternization, the molecular weight and structure of the tertiary amine-containing polymer should be selected such that the quaternary ammonium base-containing polymer is non-gelled and when mixed with an aqueous medium, a stable dispersion will form. A stable dispersion is one which does not form hard sediments upon aging. If sediments occur, it can be easily redispersed with normal agitation. In addition, the dispersion should be of sufficient cationic character that the dispersed resin particles will migrate towards the cathode when an electrical potential is impressed between the anode and the cathode immersed in the aqueous dispersion. Also, the molecular weight, structure and extent of quaternary ammonium base group formation should be controlled so that the dispersed resin will have the required rheological properties to form a continuous film on a substrate.

The structure, molecular weight and degree of quaternization are dependent on one another and the selection of one can only be made after a consideration of the other two. For example, be because of flow considerations, the quaternary ammonium base-containing polymers prepared from tertiary amine-containing resins which are prepared from polyglycidyl ethers of polyphenols should be of lower molecular weight than many of the tertiary amine-containing polymers prepared from acrylic monomers mentioned above. In addition, higher molecular weight tertiary amine-containing polymers usually require higher quaternary ammonium base contents than lower moleculr weight polymers.

In general, however, most of the quaternary ammonium base group-containing polymers useful in the practice of the present invention have moleular weights preferably within the range of 600 to 60,000, although with certain polymeric species, higher molecular weights may be usable, and preferably contain from about 0.01 to 10 milliequivalents of quaternary ammonium group per gram of resin solids. Obviously, one must use skill in the art to combine the molecular weight with the quaternary ammonium group content to arrive at a satisfactory polymer.

Reaction temperatures may be varied between the lowest temperature at which reaction reasonably proceeds, for example, room temperature, or in the usual case, slightly above ordinary room temperature, to a maximum temperature of about 120° C. Obviously, for lower molecular weight alkylene oxides such as ethylene and propylene oxide which have high vapor pressures at room temperature, lower reaction temperatures should be used, and, if desired, the reaction could be conducted under pressure to insure complete reaction. With higher molecular weight epoxies such as butyl glycidyl ether, higher reaction temperatures can be used.

A solvent is not necessary, although one is often used in order to afford better control of reaction. Aromatic hydrocarbons or monoalkyl ethers of ethylene glycol are suitable solvents.

The quaternary ammonium base group-containing polymers also contain active hydrogens in the polymer backbone which are reactive at elevated temperatures with curing agents such as amine-aldehyde condensates and blocked isocyanates. Examples of such active hydrogens are hydroxyl (exclusive of the quaternary ammonium hydroxides) and primary and secondary amino which can be introduced into the polymer backbone as described above. The curing agents are those which are capable of reacting with the active hydrogens to form a crosslinked product. Examples of suitable curing agents are amine-aldehyde condensates and capped isocyanates which are preferred. The polyisocyanate should be capped or blocked so that it will not react with the active hydrogens in the coating composition until the coated article is heated to a high temperature sufficient to uncap the blocked isocyanate and cure the coating through the development of urethane or urea crosslinks.

The capped or blocked isocyanates which may be employed in the compositions of the invention may be any isocyanate where the isocyanato groups have been reacted with a compound so that the resultant capped isocyanate is stable to active hydrogens at room temperature, that is, 20° to 30° C., but reactive with active hydrogens at elevated temperature, usually between about 90° C.–200° C.

In the preparation of the capped organic polyisocyanate, any suitable organic polyisocyanate may be used. Representative examples are aliphatic compounds such as trimethylene, tetramethylene, hexamethylene and butylidene diisocyanate; cyclohexyl compounds such as 1,4-cyclohexane diisocyanate; aromatic compounds such as para-phenylene diisocyanate; aliphatic-aromatic compounds such as 4,4'-diphenylene methane diisocyanate, 2,4- or 2,6-toluene diisocyanate and mixtures thereof. Higher polyisocyanates can be employed such as triisocyanates. Examples include triphenylmethane-4,4',4''-triisocyanate and 2,4,6-toluene triisocyanate.

Any suitable aliphatic, cycloaliphatic, aromatic alkyl monoalcohol and phenolic compound may be used as a capping agent in accordance with the present invention, such as, for example, lower aliphatic alcohols containing from 1 to 4 carbon atom such as methanol, ethanol and n-butyl alcohol; cycloaliphatic alcohols such as cyclohexanol; aromatic-alkyl alcohols such as phenyl carbinol and methyl phenyl carbinol; phenolic compounds such as phenol itself, substituted phenols in which the substituents do not adversely affect the coating operations. Examples include cresol, nitrophenol, chlorophenol and ethylphenol. Minor amounts of even higher molecular weight, relatively non-volatile monoalcohols such as 2-ethylhexanol can be used, if desired, to serve as plasticizers in the coating provided by this invention.

Additional capping agents include oximes such as methyl ethyl ketoxime, acetone oxime and cyclohexanone oxime and lactams such as epsilon-caprolactam. Use of oximes and lactams is particularly desirable because the polyisocyanates blocked with these agents unblocked and react at relatively low temperatures.

The reaction between the oranic polyisocyanate and a capping agent is usually exothermic, therefore, the polyisocyanate and the capping agent are preferably admixed at temperatures of no higher than 80° C. and preferably below 50° C. to minimize the exotherm effect.

The polyisocyanate curing agent can be used in two similar ways. The polyisocyanate can be fully capped, that is, no free isocyanate groups remain, and then added to the quaternary ammonium base group polymer to form a 2-component system. Or, the polyisocyanate can be partially capped, for example, half-capped diisocyanate so that the reactive isocyanate groups remained. The partially capped isocyanate can then be reacted with the active hydrogens in the polymeric tertiary amine under conditions which will not unblock the isocyanate nor gel the reaction mixture. This reaction in effect fully caps the isocyanate making it integral with the polymeric tertiary amine molecule.

Usually the reaction of the semi-capped polyisocyanate and the active hydrogen functionally in the polymeric tertiary amine is conducted at a low or moderate temperature which is usually about 150° C. or less to preserve the capped isocyanate groups and in order to avoid gelation and to retain latent crosslinking sites. Solvent, particularly a water-miscible one such as an ether, ester or ketone may be used. Usually the reaction is conducted in the presence of a catalyst for urethane formation at a temperature between about 60° and 120° C. Whether partially capped or fully capped, sufficient polyisocyanate is present in the coating system so that the equivalent ratio of latent curing capped isocyanate groups to active hydrogens is at least 0.1:1 and preferably about 0.3 to 2:1.

The partially capped isocyanate is reacted with the polymeric tertiary amine-containing polymer before quaternary ammonium base formation. As mentioned above, quaternary ammonium base formation preferably requires the presence of water and since the partially capped isocyanate with unreacted NCO groups will react rapidly with water, it is desirable that the partially capped isocyanate be fully reacted with the polymeric tertiary amine before quaternary ammonium base formation. With the fully capped isocyanate, the quaternary ammonium base-containing polymer is first formed and then combined with the fully capped isocyanate to form a two-component system.

Besides blocked or capped isocyanates, aminoplast resins or amine-aldehyde condensates can also be employed as curing agents in the practice of the present invention. Suitable aminoplasts for use with the quaternary ammonium hydroxide-containing polymers are described in U.S. Pat. No. 3,937,679 to Bosso and Wismer in column 16, line 3, continuing to column 17, line 47, the portions of which are hereby incorporated by reference. As disclosed in the aforementioned portions of the '679 patent, the amine-aldehyde condensates can be used in combination with methylol phenol ethers. Also, as mentioned in the aforementioned portions of the '679 patent, the amount of amine-aldehyde condensate which is employed can vary from as low as one to as high as 50 percent by weight of the composition based on total weight of amine-aldehyde condensate and quaternary ammonium base group-containing resin.

As mentioned above, aminoplast cures can also be accomplished by incorporating hydroxyl groups and N-alkoxymethyl groups into the polymeric tertiary amine-containing polymer. Quaternary ammonium base group polymers prepared from such polymeric tertiary amines are self-curing one-component systems in which the curing agent is integral with the polymer molecule. Such self-curing systems should contain about 0.1 to about 1.0 N-alkoxymethyl group for hydroxyl in the polymer molecule.

The quaternary ammonium base group-containing polymers and the thermosetting resinous compositions described above are used in the form of an aqueous dispersion for coating applications.

The term "dispersion" as used within the context of the present invention is believed to be a two-phase translucent or opaque aqueous resinous system in which the resin is the dispersed phase and water the continuous phase. The average particle size diameter of the resinous phase is generally less than 10 and preferably less than 5 microns. The term "dispersion" is also intended to cover homogeneous aqueous solutions which appear optically clear.

The concentration of the resinous products in the aqueous medium depends upon the process parameters to be used and is, in general, not critical, but ordinarily the major portion of the aqueous dispersion is water. For example, the aqueous dispersion may contain from 5 to 50 percent by weight resin solids.

Besides water, the aqueous medium may contain a coalescing solvent. The use of coalescing solvents provides in some instances for improved deposited film appearance. These solvents include hydrocarbons, alcohols, esters, ethers and ketones. The preferred coalescing solvents include monoalcohols, glycols and polyols as well as ketones and other alcohols. Specific coalescing solvents include isopropanol, butanol, isophorone, 4-methoxymethyl-2-pentanone, ethylene and propylene glycol, the monoethyl, monobutyl and monohexyl ethers of ethylene glycol, 2-ethylhexanol and tricresyl phosphate. The amount of coalescing solvent is not unduly critical and is generally between about 0.1 and 40 percent by weight, preferably about 0.5 to about 25 percent by weight based on total weight of aqueous medium.

In most instances, a pigment composition and, if desired, various additives such as surfactants or wetting agents are included in the dispersion. Pigment compositions may be any of the conventional type comprising, for example, inorganic pigment such as iron oxides, lead oxides, strontium chromate, carbon black, coal dust, titanium dioxide, talc, barium sulfate, as well as color pigments such as cadmium yellow, cadmium red, chromium yellow and the like. Organic pigments such as phthalocyanine blue and green and ultramarine blue may also be used and mixtures of pigments may be used. The pigment content of the dispersion is usually expressed as pigment-to-resin ratio. In the practice of the present invention, pigment-to-resin ratios within the range of 0.01 to 5:1 are usually used. The other additives mentioned above are present in the dispersion in amounts of at least 0.01, usually 0.01 to 5 percent by weight based on total weight of resin solids.

Aqueous dispersions of the quaternary ammonium base group-containing polymers and the thermosetting resinous compositions described above are used in coating applications. The coating compositions are useful for cationic electrocoating and are also useful for other conventional coating applications such as dip, flow, spray and roll coating. For electrocoating and the other conventional coating applications, the composition can be applied to a variety of solid substrates such as metallic substrates, i.e., steel, aluminum, and copper. For the other conventional coating applications, the compositions can be applied to non-metallic substrates such as glass, wood and plastic.

In the electrodeposition process employing the aqueous dispersions described above, the aqueous dispersion is placed in contact with an electrically conductive anode and an electrically conductive cathode with the surface to be coated being the cathode. While in contact with the aqueous dispersion, an adherent film of the coating composition is deposited on the cathode when a voltage is impressed between the electrodes.

The conditions under which the electrodeposition is carried out are, in general, similar to those used in electrodeposition of other types of coatings. The applied voltage may be varied greatly and can be, for example, as low as one volt or as high as several thousand volts, but typically between about 50 and 500 volts. The current density is usually between 1.0 ampere and 15 amperes per square foot and tends to decrease during electrodeposition, indicating the formation of a self-insulating film.

After the coating has been applied by electrocoat or flow coat, it is cured, usually by baking at elevated temperatures. Temperatures of from 90° to 260° C. for about 1 to 30 minutes are typical.

Illustrating the invention are the following examples, which, however, are not to be construed as limiting the invention to their details. All parts and percentages in the examples, as well as throughout the specification, are by weight unless otherwise specified.

EXAMPLE I

A tertiary amine-containing polymeric material was prepared by reacting an NCO-prepolymer with dimethylethanolamine. This polymer was then quaternized with lactic acid and propylene oxide.

| Charge | Parts by Weight | Number of Equivalents |
|---|---|---|
| NCO-prepolymer[1] | 280 | 0.375 |
| dimethylethanolamine | 39.5 | 0.444 |
| cyclohexanone | 79.0 | |
| lactic acid (85% aqueous solution) | 23.0 | 0.222 |
| propylene oxide | 13.0 | 0.222 |
| water | 7.2 | |
| deionized water | 70.0 | |

[1]The NCO-prepolymer was a diisocyanate-polyalkylene glycol condensate having an equivalent weight of 747. The prepolymer is commercially available from E.I. duPont de Nemours and Company as ADIPRENE L-167.

The NCO-prepolymer was charged to a reaction vessel equipped with a stirrer, thermometer, condenser, inert gas urge and dropping bottle. The dimethylethanolamine, dissolved in the cyclohexanone, was added to the reaction vessel over the period of one hour during which time the reaction mixture exothermed. During the addition, the reaction temperature was controlled between 30 and 45° C. At the completion of the addition of the dimethylethanolamine, an infrared scan was taken to determine the presence of any unreacted NCO groups. The scan indicated a trace amount. An additional 6.2 grams of dimethylethanolamine was added after which an infrared scan indicated the reaction mixture was essentially free of NCO groups. The reaction mixture was then heated to 50° C. followed by the addition of the lactic acid solution. The reaction mixture was then heated to 90° C. followed by the addition of the propylene oxide with the first portion of water. The reaction was held between 90° and 95° C. for one hour followed by the addition of the second portion of deionized water. The resin was then cooled to room temperature and was found to have a solids content of 68.7 percent. The resin contained 0.89 milliequivalents of total base per gram of resin of which 0.527 milliequivalents were quaternary ammonium base groups.

The resin was let down with water to form a 5 to 10 percent solids electrodeposition bath. Steel panels were cathodically electrodeposited in this bath at room temperature at 150 volts for 90 seconds. The electrodeposited panels were then baked at 350° F. (177° C.) for 20 minutes to give a highly glossy, somewhat tacky coating.

EXAMPLE II

A tertiary amine-containing polymeric material was prepared by reacting a polyepoxide with a secondary amine. This polymeric product was then quaternized with butyl glycidyl ether and lactic acid.

The tertiary amine-containing polymeric material was prepared from the following charge:

| Ingredient | Parts by Weight |
| --- | --- |
| EPON 1001[1] | 54.2 |
| diethylamine | 3.5 |
| POLYMEG 1020[2] | 27.2 |
| ethyl CELLOSOLVE[3] | 10.5 |
| diethyl carbitol | 4.4 |

[1]Condensate of epichlorohydrin and Bisphenol A having a molecular weight of 950–1050 and an epoxy equivalent of 475–525 which is commercially available from Shell Chemical Company.
[2]Polyoxytetramethylene glycol having a molecular weight of 1020, commercially available from Quaker Oats Company.
[3]Ethylene glycol monoethyl ether.

The EPON 1001 and POLYMEG 1020 were charged under a nitrogen blanket to a reaction vessel and heated to 85° C. to melt all the reactants. The reaction mixture was cooled to 60° C. followed by the addition of the diethylamine. The reaction mixture exothermed and the reaction temperature was held at 155°–160° C. for about four hours, after which time the reaction mixture was cooled to room temperature and found to have a solids content of 88.7 percent, and also have a total nitrogen equivalent weight of 1767, that is, 1767 grams of resin per equivalent of nitrogen.

The polymeric tertiary amine-containing resin prepared as described above was quaternized from the following charge:

| Ingredient | Parts by Weight | Equivalents |
| --- | --- | --- |
| polymeric tertiary amine-containing resin (89% total solids) | 441.7 | 0.25 |
| butyl glycidyl ether | 32.5 | 0.25 |
| lactic acid (85% aqueous solution) | 20.6 | 0.25 |
| deionized water | 9.0 | |

The polymeric tertiary amine-containing resin and water were charged to a 500 milliliter reaction kettle equipped with a stirrer, thermometer, condenser, dropping funnel and heating mantle. The contents in the reaction vessel were heated to 88° C. followed by the addition of the butyl glycidyl ether and lactic acid solution. The reaction was conducted for about 1½ hours while maintaining the temperature between 100 and 110° C. The resin had a pH of 5.4.

The resin was stored overnight and did not seem to be as dispersible the next morning as when it was freshly prepared. The resin was then cooked for an additional 3½ hours at about 100 to 105° C., after which time the pH was 7.3. The pH was adjusted to 6.5 with lactic acid and 50 milliliters of a monobutyl ether of ethylene glycol. The final resin had a solids content of 76.1 percent, an acid value of 5.1, an OH value of 246 and 0.56 percent by weight nitrogen. The resin contained 0.145 milliequivalents of quaternary ammonium salt groups per gram of resin solids.

Two hundred seventy-two (272) grams of the resin were then let down with 1630 parts by weight of deionized water to form a milky white dispersion which had a pH of 6.9. Steel panels were cathodically electrodeposited in this dispersion at a temperature of 80° F. (27° C.) and 250 volts for 90 seconds. A tacky wet film was obtained. The film was baked at 350° F. (177° C.) for 20 minutes to produce a film which was very glossy, free of pinholes and craters, although being very tacky. Baking a freshly deposited film at 400° F. (204° C.) for 20 minutes produced a tack-free film.

The polymeric tertiary amine-containing resin prepared as described above (140 parts) was combined with 16 parts by weight of an amine-aldehyde condensate curing agent (CYMEL 301 commercially available from American Cyanamid Company). The resin and crosslinker were then let down with 894 parts by weight of deionized water to form an electrodeposition bath. The pH of the bath was adjusted with 85 percent lactic acid to form a clear dispersion having a pH of 5.9. Steel panels were electrodeposited at room temperature and 300 volts for 90 seconds to form continuous wet films. The films were baked at 400° F. (204° C.) for 20 minutes to form glossy continuous films which were slightly tacky.

EXAMPLE III

An acrylic resin containing tertiary amine groups were quaternized with a mixture of propylene oxide and aqueous lactic acid. The tertiary amine-containing acrylic resin was prepared from the following charge:

| Ingredient | Parts by Weight |
| --- | --- |
| ethyl CELLOSOLVE | 1267 |
| tertiary dodecyl mercaptan | 38 |
| VAZO[1] | 19.2 |
| monomer mixture[2] | 1313 |
| VAZO | 3.8 |
| ethyl CELLOSOLVE | 269 |
| ethyl CELLOSOLVE | 384 |

[1]Azobisisobutyronitrile.
[2]Monomer mixture comprises 576 parts of ethyl acrylate, 576 parts of methyl methacrylate, 161 parts of dimethyl aminoethyl methacrylate.

The first portion of ethyl CELLOSOLVE containing the tertiary dodecyl mercaptan and the first portion of VAZO was charged to a reaction vessel and heated to reflux at 132° C. The monomer mixture was then added slowly resulting in the formation of a cloudy vapor. The monomer addition was stopped, the reaction mixture cooled to 120° C. and the monomer mixture addition initiated slowly. The monomer addition was continued over a period of 3 hours, keeping the reaction temperature between 120 to 125° C. The second portion of VAZO and ethyl CELLOSOLVE was added and the reaction mixture held at 120° C. for about 45 minutes followed by the third addition of ethyl CELLOSOLVE. The reaction mixture was kept at 120° C. for another hour and cooled to room temperature. The reaction mixture contained 39.7 percent solids (at 150° C.) as compared to a theoretical value of 41.7. The reaction mixture had an amine equivalent of 0.304 milliequivalents per gram of resin based on resin solids as compared to a theoretical value of 0.31.

The acrylic resin prepared as descried above was quaternized with a mixture of lactic acid and propylene oxide in the following charge ratio:

| Ingredient | Parts by Weight |
|---|---|
| acrylic resin reaction mixture | 2500 |
| lactic acid (80% by weight aqueous solution) | 84 |
| propylene oxide | 44 |

The acrylic resin reaction mixture prepared as described above was charged with the aqueous lactic acid solution to a reaction vessel and heated to 90° C. for about 1 hour and 40 minutes. The propylene oxide was then added over a period of 20 minutes and the reaction mixture kept at a temperature of about 86°-93° C. for about 2 hours. The reaction mixture was then slowly cooled to room temperature. The reaction mixture had a solids content of 41.3 percent measured at 105° C. and contained 0.0283 milliequivalents of total base and 0.08 milliequivalents of quaternary ammonium base groups.

Four hundred thirty-five (435) parts by weight of the quaternized acrylic resin prepared as described above was thinned with 465 parts by weight of deionized water to form an electrodeposition bath which had a pH of 6.4.

Zinc phosphated steel panels were cathodically electrodeposited in this bath at 100 volts at a bath temperature of 77° F. (25° C.) for 60 seconds (peak amperage 1.6 amps, final amperage 0.04 amps) resulting in the deposition of a clear film. The film was baked at 400° F. (204° C.) for 20 minutes resulting in a glossy, tack-free light yellow film. Similar panels were cathodically electrodeposited at 125 volts at a bath temperature of 77° F. (25° C.) for 60 seconds (peak amperage 1.8 amps, final amperage 0.06 amps) resulting in a clear, colorless, wet film. The film was baked at 400° F. (204° C.) for 20 minutes resulting in a glossy, tack-free yellow film.

EXAMPLE IV

A tertiary amine-containing polymeric material was prepared by reacting a polyepoxide with a secondary amine. This polymeric product was then quaternized with propylene oxide and lactic acid.

A polyepoxide chain extended with neopentyl glycol was prepared from the following charge:

| Ingredient | Parts by Weight |
|---|---|
| EPON 829[1] | 1389.6 |
| Bisphenol A | 448.6 |
| neopentyl glycol adipate (molecular weight 530) | 364.7 |
| isophorone | 133.9 |
| benzyl dimethylamine | 4.7 |
| 88% aqueous lactic acid solution | 5.4 |
| isophorone | 348.1 |
| methyl ethyl ketone | 622.0 |

[1]Condensate of epichlorohydrin and Bisphenol A having an epoxy equivalent of 193-203 which is commercially available from Shell Chemical Company as a 96.5 percent solution in xylene.

The EPON 829 and Bisphenol A were charged to a reaction vessel and heated to exotherm at about 155° C., then held at this temperature for about one hour and 30 minutes. The reaction mixture was cooled to 125° C. followed by the addition of the neopentyl glycol adipate and isophorone. The benzyldimethylamine catalyst was then added and the reaction mixture held at about 125°-133° C. for about four hours (Gardner-Holdt viscosity determined at a 46.6 percent solution in ethyl CELLOSOLVE was W). The second portion of isophorone and the lactic acid solution was then added and the reaction mixture cooled to 115° C. followed by thinning with methyl ethyl ketone to form a 65 percent total solids reaction mixture which had an epoxy equivalent of 3260 (1520 for 100 percent solids).

Twenty-seven hundred (2700) parts of the reaction mixture were charged dropwise to 197.4 parts of a 40 percent by weight aqueous dimethylamine solution to form the tertiary amine adduct of the epoxy resin reaction mixture. The addition was over a period of 2 hours and the temperature was kept between 40 and 75° C. with moderate heating. The resulting adduct was clear. The tertiary amine adduct reaction mixture was then distilled to remove excess amine and was found to contain 0.79 percent by weight nitrogen as compared to a theoretical value of 0.87 percent. The reaction mixture had a solids content of 80.2 percent at 150° C. and contained 0.519 percent amine nitrogen.

The tertiary amine-containing epoxy resin prepared as described above was quaternized from the following charge:

| Ingredient | Parts by Weight |
|---|---|
| tertiary amine-containing reaction mixture | 400 |
| methyl ethyl ketone | 100 |
| 80% by weight aqueous lactic acid solution | 2.6 |
| propylene oxide | 13.0 |

The tertiary amine-containing reaction mixture prepared as described above was thinned with the methyl ethyl ketone, combined with the aqueous lactic acid solution, charged to a reaction vessel and heated to 90° C. for about 10 minutes. The propylene oxide was charged to the reaction mixture over a period of 10 minutes. The reaction mixture held at reflux between 84°-88° C. for about 4 hours and 15 minutes. The reaction mixture was then cooled to room temperature, found to have a total solids content at 105° C. of 67 percent and contained 0.420 milliequivalents of base and 0.239 milliequivalents of quaternary ammonium base groups.

One hundred twelve (112) parts by weight of the quaternized resin prepared as described above (75 parts solids) was thinned with 388 parts by weight of deionized water to form an electrodeposition bath having a pH of 6.5. Zinc phosphated steel substrates were cathodically electrodeposited in this electrodeposition bath at 250 volts at a bath temperature of 80° F. (38° C.) for 90 seconds, peak amperage 1.0 amp and final amperage 0.04 amp, to form a continuous colorless film on both sides of the panel. The film was then baked at 400° F. (204° C.) for 20 minutes to form a smooth, hard, yellow, glossy film.

EXAMPLE V

A tertiary amine-containing polymer was prepared by reacting a polyepoxide with a secondary amine. This polymeric product was then quaternized with propylene oxide and water to form the quaternary ammonium hydroxide.

A polyepoxide chain extended with polycaprolactone diol was prepared from the following charge:

| Ingredient | Parts by Weight |
| --- | --- |
| EPON 829 | 1389.6 |
| Bisphenol A | 448.6 |
| PCP-0200[1] | 364.7 |
| isophorone | 133.9 |
| benzyl dimethylamine | 4.7 |
| 88% aqueous lactic acid solution | 5.4 |
| isophorone | 348.1 |
| methyl ethyl ketone | 622.0 |
| 40% aqueous solution of dimethylamine | 305.0 |

[1]Polycaprolactone diol having a molecular weight of approximately 543 commercially available from Union Carbide Corporation.

The EPON 829 and Bisphenol A were charged to a reaction vessel under a nitrogen blanket and heated to exotherm at about 150° C. and held at exotherm for about one hour with the highest temperature reaching about 198° C. The reaction mixture was cooled to about 125° C. and the PCP-0200 and the first portion of isophorone charged followed by the addition of the benzyl dimethylamine catalyst. The reaction mixture was held at a temperature of about 125° C. for about four hours until it had attained a Gardner-Holdt viscosity of S measured at 25° C. as a 50 percent solids solution in ethyl CELLOSOLVE. The reaction mixture was thinned with the second portion of isophorone and the lactic acid added to neutralize the benzyl dimethylamine catalyst. The reaction mixture was cooled to about 116° C. followed by the addition of the methyl ethyl ketone. The reaction mixture had an epoxy value of 1297 (at 100 percent solids).

The dimethylamine solution (305 parts) was added to the reaction mixture and the mixture heated to 75° C. A slight exotherm was noticed and the resin clarified. The reaction mixture was held for one hour at 75° C., heated to 80° C. and the excess dimethylamine and methyl ethyl ketone vacuum stripped. The reaction mixture contained 71.2 percent by weight total solids and 0.87 percent by weight nitrogen.

The tertiary amine-containing polymer prepared as described above was quaternized from the following charge:

| Ingredient | Parts by Weight |
| --- | --- |
| reaction mixture of tertiary amine-containing polymer | 1000.0 |
| 2-ethylhexanol | 53.0 |
| propylene oxide | 36.0 |
| deionized water | 34.4 |
| methyl ethyl ketone | 165.0 |

The reaction mixture of the tertiary amine-containing polymer prepared as described above was thinned with the 2-ethylhexanol and heated to 90° C. The propylene oxide and deionized water were then added over a period of about 40 minutes with the temperature being maintained at about 85° C. Upon completion of the addition of the propylene oxide, the resinous reaction mixture was clear. The reaction mixture was digested at a temperature of about 83° C. for 40 minutes. The dispersion was only fair in appearance. An additional 3 parts by weight of propylene oxide were added over a period of about 25 minutes, the temperature being maintained at about 84° C. The dispersion appeared excellent. The reaction mixture was then thinned with methyl ethyl ketone and cooled to room temperature. The reaction mixture had a pH of about 9.6 and was found to have a solids content of 64.1 percent. The reaction mixture contained 0.466 milliequivalents of total base per gram sample and 0.378 milliequivalents of quaternary ammonium base group per gram sample.

The reaction mixture of the quaternary ammonium hydroxide-containing polymer was prepared as described above (307.7 parts by weight) was combined with 659 parts by weight of deionized water to form an aqueous dispersion having a resin solids content of about 20.6 percent. A zinc phosphated steel panel was dipped into the dispersion, removed and permitted to drain vertically for two minutes. The coated panel was then baked at 400° F. (204° C.) for 20 minutes to give a hard, glossy film having a thickness of about 0.4 to 0.7 mil.

An additional 366 parts by weight of deionized water was added to the 20.6 percent by weight resinous dispersion to reduce further the resin solids content of the bath to about 15 percent. The pH of the dispersion was about 9.6.

Both zinc phosphated steel panels and galvanized steel panels were cathodically electrodeposited in this bath at a temperature of 77° F. (25° C.) at 200 volts for 75 seconds. The coated panels were rinsed to remove the dragout and then baked at 400° F. (204° C.) for 20 minutes to give hard, yellow, glossy films having a thickness of about 1.0 to 1.3 mils.

The reaction mixture of the quaternary ammonium hydroxide-containing polymer prepared as described above was thinned with deionized water and combined with a butylated melamine-formaldehyde crosslinker commercially available from American Cyanamid Company as CYMEL 1156 in the following charge ratio:

| Ingredient | Parts by Weight |
| --- | --- |
| quaternary ammonium hydroxide resinous reaction mixture | 230.8 |
| CYMEL 1156 | 26.4 |
| deionized water | 400.0 |

The resinous dispersion had a resin solids content of about 26.8 percent.

A zinc phosphated steel panel was dipped into the dispersion, removed therefrom and drained vertically for 2 minutes followed by baking at 350° F. (177° C.) for 20 minutes. A smooth, glossy, somewhat soft film having a thickness of about 0.65 to 0.8 mil was obtained which required 12 acetone double rubs to remove the film.

The example was repeated except that the film was baked at 400° F. (204° C.) for 20 minutes to give a hard, smooth, yellow film having a thickness of about 0.1 to 0.3 mil, of which 100 acetone double rubs did not remove the film.

To the 26.8 percent resin solids aqueous dispersion prepared as described above was added an additional 518.8 parts by weight of deionized water to reduce the solids content of the dispersion to 15 percent. The aqueous dispersion had a pH of 9.3. Both zinc phosphated and galvanized steel panels were cathodically electrodeposited in this bath which was at a temperature of 77° F. (25° C.) for 90 seconds at 200 volts. The films were baked at 400° F. (20 minutes to give hard, glossy, smooth films in which 100 acetone double rubs did not remove the film.

The quaternary ammonium hydroxide-containing resinous reaction mixture prepared as described above was combined with a fully blocked isocyanate crosslinking agent and deionized water in the following charge ratio to form a dispersion having a resin solids content of about 22 percent.

| Ingredient | Parts by Weight |
| --- | --- |
| quaternary ammonium hydroxide resinous reaction mixture | 230.8 |
| fully capped polyisocyanate curing agent[1] | 37.7 |
| deionized water | 535.0 |

[1]The fully capped polyisocyanate crosslinking agent was prepared by adding 218 parts by weight of 2-ethylhexanol slowly to 291 parts by weight of an 80/20 isomer mixture of 2,4-/2,6-toluene diisocyanate under agitation and a dry nitrogen blanket, keeping the reaction temperature under 100° F. (38° C.) by external cooling. The charge was held an additional one-half hour at 100° F. (38° C.) and then heated to 140° F. (60° C.) at which point 75 parts by weight of trimethylolpropane were added followed by 0.08 parts of dibutyltin dilaurate catalyst. After an initial exotherm, the batch was held at 250° F. (121° C.) for 1½ hours until essentially all of the isocyanate moiety was consumed as indicated by an infrared scan. The batch was then thinned with 249 parts of ethylene glycol monoethyl ether.

A zinc phosphated steel panel was dipped into the resinous dispersion, drained vertically for 2 minutes and then baked at 350° F. (177° C.) for 20 minutes. A hard, glossy, yellow film was obtained having a thickness of about 0.8 to 1.1 mils, of which 12 acetone double rubs removed the film. The example was repeated except that the panel was baked at 400° F. (204° C.) for 20 minutes. A hard, glossy, smooth film having a thickness of about 0.1 to 0.3 mil was obtained, which required 25 acetone double rubs to remove the film.

To the 22 percent by weight aqueous dispersion was added an additional 372.5 parts by weight of deionized water to reduce the resin solids content of the dispersion to about 15 percent. The pH of the dispersion was 9.4. Galvanized panels and zinc phosphated steel panels were cathodically electrodeposited in this dispersion which had a temperature of 77° F. (25° C.) at 200 volts for 90 seconds. The films were rinsed with water to remove dragout and baked at 400° F. (204° C.) for 20 minutes to give hard, glossy, smooth, yellow films having a thickness of about 0.7 mil, which required 50 acetone double rubs to remove the film.

To the resinous dispersion was added 1.76 parts by weight of dibutyltin diacetate urethane forming catalyst. The pH of the dispersion was 6.7. Zinc phosphated galvanized steel panels were cathodically electrodeposited in this bath at a temperature of 77° F. (25° C.) for 90 seconds at 200 volts. The panels were rinsed with deionized water to remove the dragout and baked at 350° F. (177° C.) for 20 minutes. Hard, glossy, smooth, yellow films were obtained having a thickness of about 0.7 mil, in which 100 acetone double rubs did not remove the film.

EXAMPLE VI

The following example shows the preparation of a quaternary ammonium hydroxide-containing polymer in which a capped isocyanate curing agent is integral with the polymer molecule. The quaternary ammonium hydroxide-containing polymer was prepared by quaternizing a tertiary amine-containing polymer with propylene oxide and water. The tertiary amine-containing polymer was first prepared by reaction a polyepoxide with a secondary amine.

A polyepoxide chain extended with PCP-0200 and containing a capped isocyanate curing agent integral with the polymer chain was prepared from the following charge:

| Ingredient | Parts by Weight |
| --- | --- |
| EPON 829 | 1389.6 |
| Bisphenol A | 448.6 |
| 2-ethylhexyl monourethane of 80/20 isomer mixture of 2,4-/2,6-toluene diisocyanate[1] | 419.1 |
| PCP-0200 | 364.7 |
| isophorone | 133.9 |
| benzyl dimethylamine | 4.7 |
| 88% by weight aqueous lactic acid solution | 5.4 |
| isophorone | 426.5 |
| methyl ethyl ketone | 736.7 |
| 40% by weight aqueous dimethylamine solution | 305.0 |

[1]95% solids in methyl isobutyl ketone.

The EPON 829 and Bisphenol A were charged to a reaction vessel under a nitrogen blanket and heated to exotherm at 150° C. and permitted to exotherm for about one hour with the highest temperature reaching about 218° C. The reaction mixture was cooled to 130° C. and the 2-ethylhexyl monourethane of toluene diisocyanate added. The reaction temperature was held at about 120° C. for about one hour to react the partially capped isocyanate into the polymer molecule. The PCP-0200 and isophorone were then added followed by the addition of the benzyl dimethylamine catalyst. The reaction mixture was digested at 125° C. for about 5 hours followed by the addition of an additional 2 parts by weight of benzyl dimethylamine catalyst. The reaction mixture was held at about 125° C. until the reaction mixture had a Gardner-Holdt viscosity of P measured at 25° C. as a 50 percent solids solution in ethyl CELLOSOLVE. The reaction mixture was then thinned with the first portion of isophorone and the lactic acid added to neutralize the benzyl dimethylamine catalyst. The reaction mixture was thinned with the methyl ethyl ketone, cooled to 80° C. and the dimethylamine solution added. At the completion of addition, the resinous reaction product was clear. The reaction mixture was digested for one hour at about 75° C., heated to 80° C. under vacuum to strip off the excess dimethylamine and methyl ethyl ketone. The resinous reaction mixture had a solids content of 69.8%, an epoxy value of 1576 (at 100 percent solids) and contained 1.73 percent by weight nitrogen.

A tertiary amine-containing polymer prepared as described above was quaternized from the following charge:

| Ingredient | Parts by Weight |
| --- | --- |
| tertiary amine polymer reaction mixture | 1110.0 |
| 2-ethylhexanol | 53.0 |
| propylene oxide | 42.0 |
| deionized water | 34.0 |

The tertiary amine polymer reaction mixture and the 2-ethylhexanol were charged to a reaction vessel and heated to 90° C. The propylene oxide and the deionized water were added over a period of about 25 minutes. The reaction mixture was digested for about 30 minutes at about 84° C. The resinous reaction product appeared clear. The dispersion was excellent and had a pH of about 8.7. The reaction mixture had a total solids content of 74 percent and contained 0.44 milliequivalents of base per gram sample and 0.32 milliequivalents of quaternary ammonium base group per gram sample.

The reaction mixture of the quaternary ammonium hydroxide-containing polymer prepared as described above was reduced to about 25 percent resin solids with deionized water. Zinc phosphated and cold rolled steel panels were dip coated in this dispersion, removed, hung vertically for 2 minutes and then baked at 350° F. (177° C.) for 20 minutes to give films having a thickness of about 0.1 to 0.3 mil which required 4 acetone double rubs to remove the film from the substrate.

The 25 percent resin solids aqueous dispersion was further reduced with deionized water to form a 15 percent by weight aqueous dispersion. Zinc phosphated cold rolled steel panels and zinc phosphated galvanized steel panels were cathodically electrodeposited in this bath at a temperature of 77° F. (25° C.) for 90 seconds at 200 volts. The panels were rinsed water to remove the dragout and baked at 350° F. (177° C.) for 20 minutes. The films were yellow, somewhat bubbly and soft. Acetone removed the films completely in less than five rubs.

Dibutyltin diacetate urethane catalyst (4.0 parts by weight) was added to the electrodeposition baths. Zinc phosphated steel and zinc phosphated galvanized steel panels were electrodeposited in the bath at a bath temperature of 77° F. (25° C.) for 90 seconds at 200 volts. The coated panels were rinsed with deionized water to remove the dragout and baked at 400° F. (204° C.) for 20 minutes to form hard, yellow films having a thickness of about 0.8 to 1.0 mil. Twenty-five double rubs with an acetone-saturated cloth partially removed the deposited film.

We claim:

1. An aqueous thermosetting resinous dispersion suitable for use in coating applications comprising a non-gelled active hydrogen-containing quaternary ammonium base group-containing polymer formed from reacting:
    (A) a polymeric tertiary amine which is the reaction product of a polyepoxide having a molecular weight of at least 350 and a secondary amine,
    (B) a 1,2-epoxy-containing material having the structural formula:

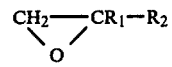

wherein $R_1$ is selected from the class consisting of hydrogen and methyl and $R_2$ is selected from the class consisting of hydrogen, alkyl including cycloalkyl, aryl, and substituted alkyl and aryl;

said reaction being conducted in the presence of sufficient acid and/or water for the formation of quaternary ammonium base groups;

said quaternary ammonium base group-containing polymer being in combination with a curing agent which is stable in the presence of the quaternary ammonium base group-containing polymer at room temperature but reactive through the active hydrogens of the quaternary ammonium base group-containing polymer at elevated temperature to form a crosslinked product.

2. The composition of claim 1 in which the polyepoxide is a polyglycidyl ether of a polyphenol.

3. The composition of claim 1 in which the 1,2-epoxy-containing material is an alkylene oxide in which $R_1$ is selected from hydrogen and alkyl containing from 1 to 18 carbon atoms.

4. The composition of claim 3 in which the 1,2-alkylene oxide is ethylene oxide or propylene oxide.

5. The composition of claim 1 in which the curing agent is selected from the class consisting of capped isocyanates and aminealdehyde condensates.

6. The composition of claim 5 in which the curing agent is a fully capped isocyanate and is present as a separate component in combination with the quaternary ammonium base group-containing polymer.

7. The composition of claim 5 in which the curing agent is a capped isocyanate which is integral with the quaternary ammonium base group-containing polymer.

8. A coated article comprising a solid substrate having thereon a crosslinked resinous coating composition, said resinous coating composition before becoming crosslinked being deposited on said substrate from an aqueous resinous dispersion in which the resinous phase comprises the compositions of any of Claims 1, 2, 3, 4, 5, 6 or 7.

* * * * *

UNITED STATES PATENT AND TRADEMARK OFFICE
CERTIFICATE OF CORRECTION

PATENT NO. : 4,170,579

DATED : October 9, 1979

INVENTOR(S) : Joseph F. Bosso and Marco Wismer

It is certified that error appears in the above-identified patent and that said Letters Patent are hereby corrected as shown below:

Column 1, line 37, "many" should be --may--.

Column 4, line 55, "seconary" should be --secondary--; line 58, "or" should be --of--.

Column 5, lines 27-28, "structured" should be --structural--; line 58, "follpwing" should be --following--.

Column 6, line 37, "containin" should be --containing--.

Column 7, line 29, "neutrailized" should be --neutralized--.

Column 8, line 32, delete "be" before "because".

Column 9, line 45, "atom" should be --atoms--; line 62, "unblocked" should be --unblock--; line 63, "oranic" should be --organic--.

Column 10, line 15, "functionally" should be --functionality--.

Column 12, line 48, "urge" should be --purge--.

Column 14, line 35, "were" should be --was--.

UNITED STATES PATENT AND TRADEMARK OFFICE
CERTIFICATE OF CORRECTION

PATENT NO. : 4,170,579

DATED : October 9, 1979

INVENTOR(S) : Joseph F. Bosso and Marco Wismer

It is certified that error appears in the above—identified patent and that said Letters Patent are hereby corrected as shown below:

Column 18, line 5, delete "was"; line 64, insert --(204°C.) for-- after "400°F."; line 64, delete the parenthesis before "20".

Column 19, line 35, insert --steel-- after "Galvanized"; line 63, "reaction" should be --reacting--.

Column 20, line 66, "millequivalents" should be --milliequivalents--.

Column 21, line 17, insert --with-- before "water".

Signed and Sealed this

Fifth Day of February 1980

[SEAL]

Attest:

Attesting Officer

SIDNEY A. DIAMOND

Commissioner of Patents and Trademarks